United States Patent
Shunichiro et al.

[15] 3,674,741
[45] July 4, 1972

[54] COPOLYMER OF POLY(QUINOZOLONE AND IMIDE) AND PROCESS FOR PRODUCING THE SAME

[72] Inventors: Nishizaki Shunichiro; Fukami Akira, both of Amagasaki, Japan

[73] Assignee: Mitsubishi Electric Corporation

[22] Filed: July 24, 1970

[21] Appl. No.: 58,148

[30] Foreign Application Priority Data

Aug. 1, 1969 Japan..................................44/60854
Aug. 1, 1969 Japan..................................44/60855

[52] U.S. Cl..................260/47 CP, 117/124 E, 117/128.4, 260/30.2, 260/30.8 DS, 260/32.6 N, 260/33.4 P, 260/65, 260/78 TF
[51] Int. Cl...................................C08g 20/32, C08g 33/02
[58] Field of Search ..........................260/47 ZP, 78 TF, 65

[56] References Cited

UNITED STATES PATENTS

| | | | |
|---|---|---|---|
| 3,179,614 | 4/1965 | Edwards | 260/30.2 |
| 3,408,326 | 10/1968 | Errede | 260/47 |
| 3,444,136 | 5/1969 | Belohlav et al. | 260/47 |

*Primary Examiner*—William H. Short
*Assistant Examiner*—L. L. Lee
*Attorney*—Oblon, Fisher & Spivak

[57] ABSTRACT

A copolymer of poly (quinazolone and imide) containing at least 2 quinazolone rings for each repeating unit of the copolymer, is produced by reacting a primary aromatic diamine, bisbenzoxazinone and an aromatic tetracarboxylic dianhydride or its diester. The copolymer of this invention is characterized by good solubility in various organic solvents and excellent viscosity stability and film formability. It is also characterized by excellent electrical and mechanical properties and good heat stability.

12 Claims, No Drawings

COPOLYMER OF POLY(QUINOZOLONE AND IMIDE) AND PROCESS FOR PRODUCING THE SAME

BACKGROUND OF THE INVENTION

1. Field of the Invention

This invention relates to a novel solvent soluble polyimide and to a process for producing the same, and more particularly to a novel copolymer of poly(quinazolone-imide) and to a process for producing the same.

2. Description of the Prior Art

It has been known that polyimides are characterized by such excellent heat resistance that they can be used in a wide variety of products requiring excellent mechanical, electrical and thermal properties. The current technique for producing these conventional products, however, has many disadvantages which render these methods at least partially unsuitable for many commercial applications. For instance, in one conventional process for producing polyimides, a diamine is reacted with an aromatic tetracarboxylic dianhydride in the presence of anhydrous dimethyl acetamide, N-methylpyrrolidone, dimethyl sulphoxide or a mixture of these materials. This technique provides a soluble polyamide acid intermediate which is converted into a polyimide by heating or by chemical reaction. However, the polyamide carboxylic acid intermediate produced in that process usually contains a low molecular weight polymeric component which is relatively unstable to aging. Subsequent cyclization to produce an imide-ring, therefore, will often result in the formation of an insoluble material. Moreover, this insoluble material can become infusible upon heating so that treatment of the ultimate polyimide product is difficult.

Furthermore, although conventional polyimides, such as those used for coating electrical wire are characterized by good electrical properties, it is necessary to apply the conventional resin several times by a multi-step coating process since the presence of the water produced during the conversion of polyamide acid into the polyimide accelerates hydrolysis of the polyimide. It is therefore difficult to obtain a coating of greater than several tens of microns.

SUMMARY OF THE INVENTION

It is therefore an object of this invention to provide copolymers of poly (quinazolone-imide) having at least 2 quinazolone rings in each repeating unit, which copolymer is characterized by good electrical insulation properties, high heat stability in mechanical use, good film formability, and high strength characteristics which are suitable for molding, casting, or plying the resin or for forming a resinous film or coating.

It is another object of this invention to provide polyimide type copolymers which are soluble in various organic solvents, and which do not readily crack or harden or shrink to any great extent, as do conventional polyimides.

A further object of this invention is to provide copolymers which can be more easily coated as compared with conventional aromatic polyimides.

These and other objects have not herein been attained by providing copolymers of poly(quinazolone-imide) having at least 2 quinazolone rings in each repeating unit, which are produced by reacting a primary aromatic diamine with bis-benzoxazinone, an aromatic tetracarboxylic dianhydride, or a diester of aromatic tetracarboxylic dianhydride.

It is believed that the poly(quinazolone-imide) copolymer of this invention has the structure:

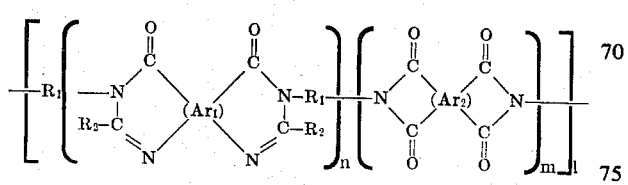

wherein each of $m$ and $n$ is a number of between 1 and 2; $l$ is a number of greater than 1; each of $(Ar_1)$ and $(Ar_2)$ is a tetravalent aromatic residual radical; $R_1$ is a divalent aromatic residual radical; and $R_2$ is a monovalent aromatic residual radical.

DESCRIPTION OF THE PREFERRED EMBODIMENTS

The starting material for this invention is either an aromatic tetracarboxylic dianhydride having the formula:

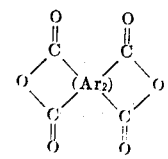

or the diester of this material, having the formula:

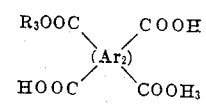

wherein $(Ar_2)$ represents a tetravalent aromatic residual radical. Wherein when the starting material is the anhydride, each pair of the carbonyl groups will be directly bonded to adjacent carbon atoms on the $(Ar_2)$ group to form the following anhydrous five-membered ring structure:

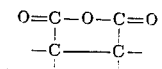

or

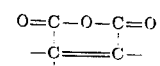

$R_3$ represents a monovalent hydrocarbon. When the starting material is a diester, two carboxylic groups and two ester groups will be bonded at orthopositions on the aromatic nucleus. Suitable compounds usable in the present invention include the tetracarboxylic dianhydrides or its diesters, such as: pyromellitic dianhydride; 3,3', 4,4'-benzophenone tetracarboxylic dianhydride; 3,3', 4,4'-diphenyl tetracarboxylic dianhydride; 2,2',3,3'-benzophenone tetracarboxylic dianhydride; 2,2',3,3'-diphenyl tetracarboxylic dianhydride; 2,2-bis-(3,4-dicarboxyphenyl)propane dihydride; bis-(3,4-dicarboxyphenyl)ether dianhydride; 2,3,6,7-naphthalic tetracarboxylic dianhydride; 1,2,4,5-naphthalic tetra-carboxylic dianhydride, 1,2,5,6-naphthalic tetracarboxylic dianhydride; 1,1-bis(2,3-dicarboxyphenyl)ethane dianhydride; 1,1-bis(3,4-dicarboxyphenyl)ethane dianhydride; bis-(3,4-dicarboxyphenyl)methane dianhydride; and dimethyl esters thereof or diethyl esters thereof.

The diamines useful in the condensation polymerization reaction of this invention are characterized by the formula:

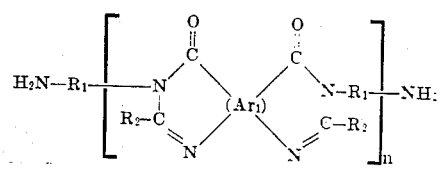

wherein $(Ar_1)$ represents a tetravalent aromatic residual radical having two pairs of bonds in the ortho-position of the aromatic nucleus, as follows:

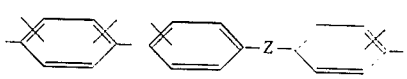

wherein Z represents a direct carbon-to-carbon bond or a non-reactive divalent radical capable of bonding both of the aromatic rings, such as: $-(CH_2)_m-$, $-O-$, $-S-$, $-CONH-$, $-COO-$, $-SO_2-$; and $m$ represents an integer of greater than 1; $n$ represents a number of from about 1 to 10 or a fraction thereof taken as an average; $R_1$ represents:

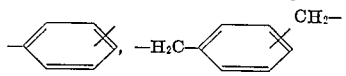

or

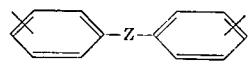

$R_2$ is an alkyl or an aryl group or a derivative thereof, for example, a derivative containing $-CH_3$, $-CH_2-CH_3$, or

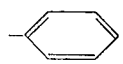

The medium for the condensation polymerization reaction should be non-reactive toward the monomer used in the reaction, such as preferably eresylic, phenol, chlorophenol, cresotic acid, xylic acid, dimethylacetamide, dimethylsulfoxide, N-methylpyrrolidone, or mixtures thereof.

The diamines containing a quinazolone ring described above are produced by reacting a primary aromatic diamine with bis-benzoxazinone.

The quinazolone or the amino-terminated polyquinazolone can be reacted with a tetracarboxylic dianhydride or its diester in the polymerization medium without a catalyst. However, if desired, a catalyst may be used such as p-toluenesulfonic acid, ferric chloride, stannic chloride, lithium chloride, zinc chloride, ferrous acetonylacetonate. Good results are obtainable when the catalyst is used in an amount of from 0.01 to 5 percent by weight of the monomer. The temperature of the reaction depends upon the particular monomer and the particular reaction medium used. Good results are obtainable at a temperature of between 30° and 250° C., and especially 100° to 230° C.

The molar ratio of components used for this reaction may be from 0.9 : 1 to 1 : 1.1. Quinazolone or amino end terminated polyquinazolone to aromatic tetracarboxylic dianhydride or its esters.

When pure components are used in carrying out the reaction, the tetracarboxylic dianhydride or its esters are usually added to the aromatic diamine in the form of a solution with the polymerization medium. Alternatively, both of the reaction components can be mixed and then dissolved in the polymerization medium. A mixture of said aromatic diamines or a mixture of said tetracarboxylic dianhydrides or its esters can also be used. Where the purity of the reactant is unknown, the required amount of each reactant can be determined by the following method. The condensation polymerization product is produced by adding the tetracarboxylic dianhydride dropwise to the quinazolone or to the amino end terminated polyquinazolone, which is dissolved in the reaction medium. The temperature is maintained at up to 150° C., and the medium is stirred, if a polar solvent, such as dimethylacetoamide is used as the polymerization medium.

When the tetracarboxylic dianhydride is added, the viscosity of the solution will increase, and if tetracarboxylic dianhydride is continued to be added, a maximum viscosity will be obtained. Addition of the tetracarboxylic dianhydride should continue until the maximum viscosity is obtained or just prior to obtaining the maximum viscosity. This reaction is carried out at 25° to 50° C., but the temperature of the reaction will increase to about 150° C. after the maximum viscosity is obtained. At that point, the viscosity will become stabilized.

Where an acidic solvent, such as cresol, or chlorophenol is used, tetracarboxylic dianhydride or its diester is added to the diamine while agitating the mixture at a temperature of greater than 150° C. The rate of viscosity increase is controlled.

In order to obtain a polymer having the greatest degree of molecular weight stability and the highest molecular weight, it is necessary to discontinue the addition of the dianhydride or the diester once the maximum viscosity is obtained, or just prior to reaching the maximum viscosity.

The quinazolone polyimide of this invention is a copolymer whose properties can be altered by varying the ratio of the quinazolone to the imide and by varying the particular reactants. The copolymer can be produced by (1) reacting quinazolone or an amino terminated polyquinazolone with a tetracarboxylic dianhydride or its ester, or (2), by reacting a diamine with the tetracarboxylic dianhydride or its diester to produce an amidic acid or an amino terminated imide. Bis-benzoxazinone is then reacted through the amino group to produce a quinazolone ring which is thereafter polymerized. The resulting copolymers produced by the process of this invention are heat-resistant resins which are solvent-soluble and stable at high temperatures.

Unlike prior art polyimides, the copolymers of the present invention are capable of being cast into thick films which are characterized by high mechanical strength and high adhesiveness. The quinazolone ring containing polyimides of this invention can be prepared in the form of a solution which can be used for producing stable high temperature resistant electric wire insulation, and also for producing films, foils, plyboards, shaped articles, and the like. These polyimides can be mixed with conventional polyesters or conventional solvent-soluble polyimides for various products, such as electric wire coatings.

Having generally described the invention, a further understanding can be obtained by reference to certain specific Examples which are provided herein for purposes of illustration only and are not intended to be limiting in any manner.

EXAMPLE 1

16.7 g. of 6,6'-methylene-bis(2-methyl-benzoxazine-4-4-on), 20.8 g. of 4,4'-diamino diphenylmethane and 100 g. of cresol were reacted while stirring at 150° C. for 3 hours. The mixture was then cooled to room temperature and poured into ethyl ether to obtain a precipitate. The resulting precipitate was completely washed with acetone and dried at 150° C. for 1 hour to obtain 32 g. of white powder. The amine value of the product was 348, and accordingly the product consisted of 1 mole of bisoxazinone and 2 moles of diamine, which has two amino groups.

EXAMPLE 2

23 g. of the product of Example 1 and 12 g of 3,3',4,4'-benzophenone dimethyl tetracarboxylate were dissolved in 120 g. of cresol and reacted at 150° C. for 5 hours and then reacted at 200° C. for 6 hours to obtain a highly viscous solution of the polymer. The intrinsic viscosity of the solution in m-cresol at 25° C. was 0.76. an IR spectrum of a film prepared by coating the copolymer on a glass plate and heating at 180° C. for 3 hours showed absorption bands of the quinazolone ring at $1692^{cm-1}$ and $1593^{cm-1}$ and also absorption bands of imide radical at $1776^{cm-1}$ and $723^{cm-1}$. Absorption bands of the ester bond were noted at $172.8^{cm-1}$ disappeared. By using the solution of the copolymer, a film having a thickness of more than 20 m$\mu$ was obtained by coating and heating at 150° C. for 2 hours and then re-heating at 200° C. for 2 hours. The film was characterized by high strength and was durable against repeated bending, without cracking.

EXAMPLE 3

16.7 g. of 6,6'-methylene-bis(2-methylbenzoxazine-4-on) and 220 g. of 4,4'-diaminodiphenyl ether were dissolved in 380 g. of dimethyl acetoamide. The solution was reacted at 140° C. for about 2 hours and then cooled at 25° C. Pyromellitic anhydride was added dropwise to the resulting product. The reaction temperature was raised to 35° — 40° C. After about 10 minutes after the addition of the pyromellitic anhydride, the viscosity of the product was measured. The results were as follows:

| Pyromellitic anhydride (g) | Viscosity at 35°C. (poise) |

| | |
|---|---|
| 3.0 | 3.8 |
| 3.0 | 8.0 |
| 2.0 | 18.3 |
| 2.0 | 45.0 |
| 2.0 | 62.5 |
| 2.0 | 53.0 |

The resulting solution having a high viscosity was heated at 150° C. for 2 hours and then cooled to room temperature and poured into methanol to precipitate the polymer. 43 g. of a white powder was obtained by vacuum drying at room temperature. The resulting polymer could be dissolved in cresol, dimethylacetoamide, and N-methylpyrrolidone. An IR spectrum of the polymer powder showed absorption bands of quinazolone ring at $1690^{cm-1}$ and $1594^{cm-1}$ and also absorption bands of the imide radical at $1775^{cm-1}$ and $723^{cm-1}$. The polymer was dissolved in a solvent and cast into a continuous film. The weight loss of polyimide film was measured with the following result:

| Time at 25° C. | Weight Loss (%) |
|---|---|
| 1 hour | 1 % |
| 1,000 hours | 5 % |

EXAMPLE 4

15.4 g. of 6,6'-bis(2-methylbenzoxazine-4-on), 22.0 g. of 4,4'-diaminodiphenylether and 13.1 g. of pyromellitic dianhydride were dissolved in 250 g. of chlorophenol. The solution was reacted at 120° C. for 4 hours and then heated at 200° C. whereby water was evaporated out of the reaction system. After 5 hours of reaction, a viscous solution was obtained. The intrinsic viscosity of the product in m-cresol at 25° C. was 0.88. The solution was coated on a glass plate and heated at 150° C. for 4 hours and then at 200° C. for 2 hours to obtain a transparent film. An IR spectrum of this film showed absorption bands of the quinazolone ring at $1690^{cm-1}$ and $1594^{cm-1}$, and also absorption bands of the imide ring at $1778^{cm-1}$ and $724^{cm-1}$. The film is characterized by high strength and flexibility. The mechanical and electrical characteristics of the film treated at 250° C. in a ventilated dryer were as follows:

| Time (days) | Mechanical Properties | | Electrical Properties | |
|---|---|---|---|---|
| | Elongation (%) | Strength | Resistance (Ω·cm) | tan φ |
| 1 | 9.8 | 12.0 | $10^{16}$ | 2.3 |
| 100 | 9.0 | 12.3 | $10^{16}$ | 2.8 |

EXAMPLE 5

10.0 g. of 4,4'-diaminodiphenylether and 4.3 g. of pyrromellitic dianhydride were dissolved in 100 g. of cresol and heated at 150° C. for 2 hours to react the mixture. The resulting solution was heated at 180° C., and 6,6'-methylene-bis (2-methylbenzoxazine-4-on) were added dropwise. The viscosity of the product was measured after 20 minutes. The relation of the viscosity and amounts of reactant added were as follows:

| Bisoxazinone (added) (g) | Viscosity at 40° C. (poise) |
|---|---|
| 2.0 | 2.1 |
| 2.0 | 3.8 |
| 2.0 | 10.5 |
| 2.0 | 18.8 |
| 2.0 | 27.4 |
| 1.0 | 26.0 |

By using the resulting solution, a transparent and flexible film was produced. An IR spectrum of this film showed deep absorption bands of the quinazolone ring and the imide ring.

EXAMPLE 6

227 parts of a diamine having a quinazolone ring having the formula:

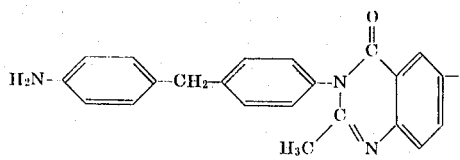

and 71 parts of pyrromellitic dianhydride and 800 parts of cresol were poured into a four neck flask and dissolved while stirring in a nitrogen gas atmosphere. The reaction temperature was maintained at 150° C. for 4 hours and then increased to 200° C. A viscous solution was obtained after reacting for 10 hours. The water produced in the condensation polymerization was evaporated. The intrinsic viscosity of this solution in m-cresol at 25° C. was 0.78. An IR spectrum of a film produced by coating the solution onto a glass plate and evaporating m-cresol in vacuum at room temperature showed absorption bands of (C = O) and —C = N— of quinazolone ring at $1690^{cm-1}$ and $1595^{cm-1}$ and also absorption bands of imide at $1776^{cm-1}$ and $723^{cm-1}$. Even though the film was heated and hardened at 250° C. for 4 hours, the intensity of the absorption bands of the imide radical did not increase.

EXAMPLE 7

227 parts of a quinazolone diamine used in Example 6 were completely dissolved in 900 parts of dimethylacetoamide. 72 parts of pyrromellitic dianhydride were added to the solution in several aliquots while stirring at room temperature for 2 hours. The temperature of the solution rose to about 50° C. to obtain a highly viscous polyamide acid solution. The intrinsic viscosity of the solution in dimethylacetoamide at 25° C. was 1.10. The solution was reacted by heating at 100° C. for 4 hours. The resulting product was poured into methanol to form a precipitate. A yellow polymeric powder was obtained by vacuum drying at room temperature. The resulting polymer was found to be soluble in dimethylacetoamide, dimethylsulfoxide, dimethylformamide, cresol, and cresotic acid. The intrinsic viscosity of the polymer in m-cresol at 25° C. was 0.74. An IR spectrum (KBr tablet method) of the polymer showed absorption bands of —C = O and —C = N— of quinazolone ring at $1690^{cm-1}$ and $1595^{cm-1}$ and also absorption bands of imide radical at $1776^{cm-1}$ and $723^{cm-1}$. No absorption of amide acid was found.

EXAMPLE 8

228 parts of a quinazolone containing diamine having the formula:

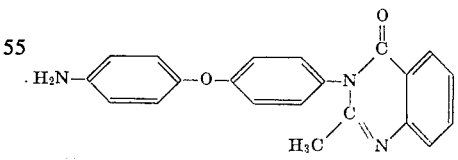

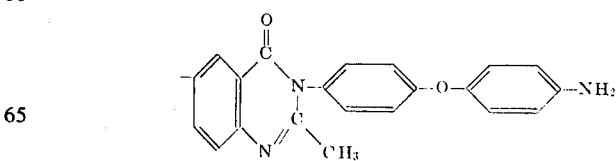

and 73 parts of pyrromellitic dianhydride were dissolved in 800 parts of cresol and reacted at 150° C. for 5 hours. The mixture was raised to refluxing temperature and reacted for 10 hours. After removing water from the reaction system, a highly viscous solution was obtained. The intrinsic viscosity of the polymer in m-cresol at 25° C. was 1.87. An IR spectrum of film produced by coating the solution on a glass plate and

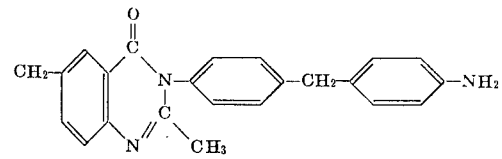

vacuum drying at room temperature to remove the solvent showed an absorption band of quinazolone ring at 1692$^{cm-1}$ and 1593$^{cm-1}$, and an absorption band of imide radical at 1775$^{cm-1}$ and 722$^{cm-1}$. By coating the solution on a glass plate and heating it, a strong and flexible film of greater than 40 $\mu$ thickness can be obtained. Even though the film is heated at 250° C. for 500 hours, the mechanical properties of this film did not decrease as follows. This data shows that the polymer has excellent heat resistance:

| Polyquinazolone-imide film | | Conventional film | |
| --- | --- | --- | --- |
| normal condition | 500 hours heating | normal condition | 500 hours heating |
| strength 10.0 (kg/mm²) | 10.8 | 10.5 | 9.8 |
| elongation (%) 11.2 | 10.5 | 13.8 | 13.1 |

EXAMPLE 9

228 parts of a quinazolone containing diamine used in Example 8 and 129 parts of 3,3',4,4'-benzophenonetetracarboxylic dimethyl ester (-dimethyl tetracarboxylate), 700 parts of cresol, and 20 parts of LiCl were dissolved and gradually heated to 150° C. and the reaction temperature was maintained at 150° C. for 2 hours. The solution was further heated at 190° –200° C. for 15 hours to obtain a highly viscous solution. The intrinsic viscosity of the solution in m-cresol at 25° C. was 0.83. After precipitating the polymer from methanol, the polymer was vacuum dried at room temperature to obtain a yellow powdered polymer. An IR spectrum of the polymer showed absorption bands of quinazolone ring at 1692$^{cm-1}$ and 1593$^{cm-1}$, and absorption bands of polyimide at 1775$^{cm-1}$ and 723$^{cm-1}$. No absorption band of the ester group was found. The polymer was soluble in dimethylacetoamide, dimethylsulfoxide, N-methyl-pyrrolidone, etc. A flexible film was obtained from the solution of polymer. The polymer was stable at temperatures of less than 450° C. in air. The weight loss of the polymer after heating at 300° C. in a circulation type dryer for 500 hours was only about 5 percent based on the initial weight. This showed the high heat resistance of the polymer.

Having now fully described the invention, it will be apparent to one of ordinary skill in the art that many changes and modifications can be made to the invention without departing from the spirit or scope. Accordingly,

What is claimed and desired to be secured by Letters Patent is:

1. The copolymer, poly(quinazolone-imide), having at least two quinazolone rings in each repeating unit which is produced by reacting, a. a primary aromatic diamine having the formula: H₂ N— R₁ — NH₂ wherein R₁ is a divalent aromatic residual radical
   b. a bis-oxazinone, and
   c. an aromatic tetracarboxylic dianhydride having the formula:

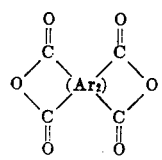

or diester thereof having the formula:

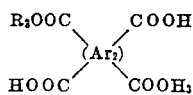

wherein (Ar₂) is a tetravalent aromatic residual radical, and R₃ represents a monovalent hydrocarbon, and wherein the reaction product of said primary aromatic diamine and said bis-oxazinone is a diamine having the formula:

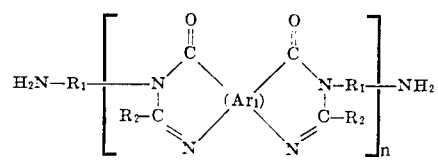

wherein n is a number of from about 1 to 10 or a fraction thereof taken as an average, (Ar₁) is a tetravalent aromatic residual radical, and R₂ is an alkyl or an aryl group or a —CH₃, —CH₂—₃ or

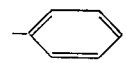

lower alkyl or aryl derivative thereof.

2. The copolymer of claim 1, wherein R₁ is selected from the group consisting of:

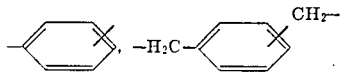

and

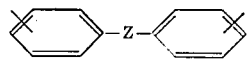

wherein Z is a direct carbon-carbon bond or a non-reactive divalent radical which can bond both of the aromatic rings.

3. The copolymer, poly (quinazolone-imide), of claim 1 wherein (Ar₁) is a tetravalent aromatic residual radical which has two pairs of bonds in ortho-position said tetravalent radical being selected from the group consisting of

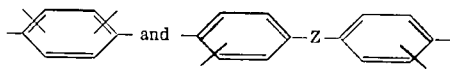

and wherein Z is a direct carbon-carbon bond or a nonreactive divalent radical which can bond both of the aromatic rings.

4. The copolymer, poly(quinazolone-imide) having at least two quinazolone rings in each repeating unit which is produced by reacting, a. a primary aromatic diamine having the formula:

H₂N — R₁ — NH₂ b. a bis-oxazinone and c. an aromatic tetracarboxylic dianhydride selected from the group consisting of pyromellitic dianhydride; 3,3',4,4'-benzophenonetetracarboxylic dianhydride; 3,3',4,4'-diphenyl tetracarboxylic dianhydride; 2,2',3,3'-benzophenone tetracarboxylic dianhydride; 2,2',3,3'-diphenyl tetracarboxylic dianhydride; 2,2-bis- (3,4-dicarboxyphenyl)-propane dianhydride; bis-(3,4-dicarboxyphenyl)ether dianhydride; 2,3,6,7-naphthalic tetracarboxylic dianhydride; 1,2,4,5-naphthalic tetracarboxylic dianhydride; 1,2,5,6-naphthalic tetracarboxylic dianhydride; 1,1-bis(2,3-dicarboxyphenyl)ethane dianhydride; 1,1-bis(3,4-dicarboxyphenyl)ethane dianhydride; bis(3,4-dicarboxyphenyl)methane dianhydride; and dimethyl esters thereof and diethyl esters thereof, wherein the reaction product of said primary aromatic diamine and said bis-oxazinone is a diamine having the formula:

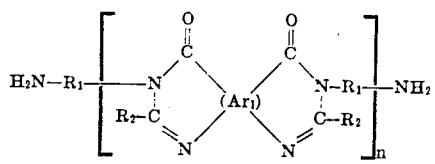

wherein (Ar₁) is a tetravalent aromatic residual radical selected from the group consisting of:

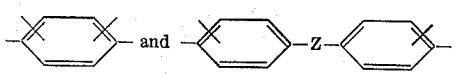

wherein $R_1$ is a divalent aromatic residual radical selected from the group consisting of:

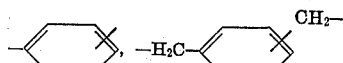

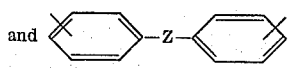

$R_2$ is an alkyl or an aryl group or a —$CH_3$, —$CH_2$—$CH_3$,

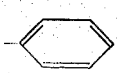

and derivatives thereof, Z is selected from the group consisting of;

—$(CH_2)_m$—, —O—, —S—, —CONH—, —COO—, and —$SO_2$—, wherein $m$ is an integer of greater than 1 and $n$ represents a number of from 1 to 10 or a fraction thereof taken as an average.

5. The copolymer, poly (quinazolone-imide), of claim 1 wherein the aromatic tetracarboxylic dianhydride or diester is selected from the group consisting of pyromellitic dianhydride; 3,3', 4,4'-benzophenone tetra-carboxylic dianhydride, 3,3',4,4'-diphenyl tetracarboxylic dianhydride; 2,2',3,3'2,2',3,3' -diphenyl tetracarboxylic dianhydride; 2,2-bis-(3,4-dicarboxyphenyl), propane dihydride; bis- (3-4-dicarboxyphenyl) ether dianhydride; 2,3,6,7-naphthalic tetracarboxylic dianhydride; 1,2,4,5-naphthalic tetracarboxylic dianhydride; 1,2,5,6-naphthalic tetracarboxylic dianhydride; 1,1-bis (2,3-dicarboxyphenyl) ethane dianhydride; 1,1-bis-(3,4-dicarboxyphenyl) ethane dianhydride; bis-(3,4-dicarboxyphenyl)methane dianhydride; and dimethyl esters thereof and diethyl esters thereof.

6 A process for producing the copolymer,poly(quinazolone-imide),characterized by reacting
a. primary aromatic diamine having the formula:

$$H_2N—R_1—NH_2$$

wherein $R_1$ is a divalent aromatic residual radical
b. a bisbenzoxazinone, and
c. an aromatic tetracarboxylic dianhydride having the formula:

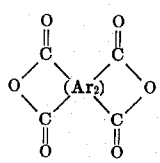

or diester thereof having the formula:

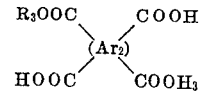

wherein ($Ar_2$) is a tetravalent aromatic residual radical and $R_3$ represents a monovalent hydrocarbon and wherein the reaction product of said primary aromatic diamine and said bisbenzoxazinone is a diamine having the formula:

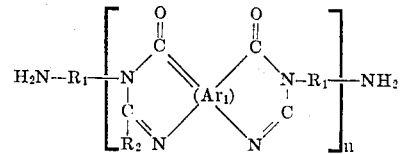

wherein $n$ is a number of from 1 to 10 or a fraction thereof taken as an average, ($Ar_1$) is a tetravalent aromatic residual radical and $R_2$ is an alkyl or aryl group or a —$CH_3$, —$CH_2$—$CH_3$, or

derivative thereof.

7. A process for producing the copolymer, poly (quinazolone-imide), of claim 6, wherein the reaction medium contains at least one compound selected from the group consisting of cresol, phenol, chlorophenol, cresylic acid, xylic acid, dimethylacetamide, dimethylsulfoxide, and N-methyl pyrrolidone.

8. A process for producing the copolymer, poly (quinazolone-imide), of claim 6, wherein the catalyst selected from the group consisting of p-toluene-sulfonic acid, ferric chloride, stannic chloride, lithium chloride, zinc chloride, ferrous acetonylacetonate, is used in an amount of from 0.01 to 5 percent by weights of the monomer.

9. A process for producing the copolymer, poly (quinazolone-imide), of claim 6, wherein all of the reactants of (a), (b), and (c) are reacted together for in one step.

10. A process for producing the copolymer, poly (quinazolone-imide), of claim 6, wherein : (a) at least one primary aromatic diamine is reacted with (b) at least one bisbenzoxazinone, and then the product is reacted with (c) at least one aromatic tetracarboxylic dianhydride or diester thereof.

11. A process for producing the copolymer, poly (quinazolone-imide), of claim 6, wherein (a) at least one primary aromatic diamine is reacted with (c) at least one aromatic tetracarboxylic dianhydride or diester thereof and the product is then reacted with (b) at least one bisbenzoxazinone.

12. The process of claim 6 wherein the reaction is conducted at temperatures of from 30° to 250° C.

* * * * *